United States Patent
Kawashima et al.

(10) Patent No.: US 10,065,484 B2
(45) Date of Patent: Sep. 4, 2018

(54) VEHICLE MEMBER ATTACHMENT STRUCTURE AND REAR SPOILER ATTACHMENT STRUCTURE

(71) Applicant: TOYOTA JIDOSHA KABUSHIKI KAISHA, Toyota-shi, Aichi-ken (JP)

(72) Inventors: Mutsumi Kawashima, Nisshin (JP); Miho Mizukoshi, Obu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 172 days.

(21) Appl. No.: 15/100,851

(22) PCT Filed: Dec. 4, 2014

(86) PCT No.: PCT/JP2014/082176
§ 371 (c)(1),
(2) Date: Jun. 1, 2016

(87) PCT Pub. No.: WO2015/087787
PCT Pub. Date: Jun. 18, 2015

(65) Prior Publication Data
US 2016/0303954 A1    Oct. 20, 2016

(30) Foreign Application Priority Data
Dec. 12, 2013   (JP) .................. 2013-257113

(51) Int. Cl.
*B60J 5/10*   (2006.01)
*B62D 35/00*  (2006.01)
*B62D 29/04*  (2006.01)

(52) U.S. Cl.
CPC .......... *B60J 5/107* (2013.01); *B62D 29/046* (2013.01); *B62D 35/007* (2013.01)

(58) Field of Classification Search
CPC ....... B62D 29/046; B62D 35/007; B60J 5/107
USPC ..................... 296/180.1, 121, 218
See application file for complete search history.

(56) References Cited

U.S. PATENT DOCUMENTS

| | | | |
|---|---|---|---|
| 4,767,154 A * | 8/1988 | Okamoto ............. | B60J 7/106 296/210 |
| 5,360,253 A | 11/1994 | Sasaki et al. | |
| 6,042,174 A * | 3/2000 | Durrani .............. | B60J 7/1851 292/DIG. 5 |

FOREIGN PATENT DOCUMENTS

| | | |
|---|---|---|
| EP | 1911664 A1 | 4/2008 |
| EP | 2653332 A2 | 10/2013 |
| JP | H05-56766 U | 7/1993 |
| JP | 2006-219074 A | 8/2006 |
| JP | 2008-094209 A | 4/2008 |
| JP | 2008-307909 A | 12/2008 |
| JP | 2010-030465 A | 2/2010 |
| JP | 2013-220785 A | 10/2013 |

* cited by examiner

*Primary Examiner* — Joseph D. Pape
(74) *Attorney, Agent, or Firm* — Oliff PLC

(57) ABSTRACT

A recess is formed at a door outer panel, and a reference pin provided at a rear spoiler abuts a front wall of the recess, thereby enabling the rear spoiler to be positioned with respect to a back door in a vehicle front-rear direction and a vehicle vertical direction.

5 Claims, 4 Drawing Sheets

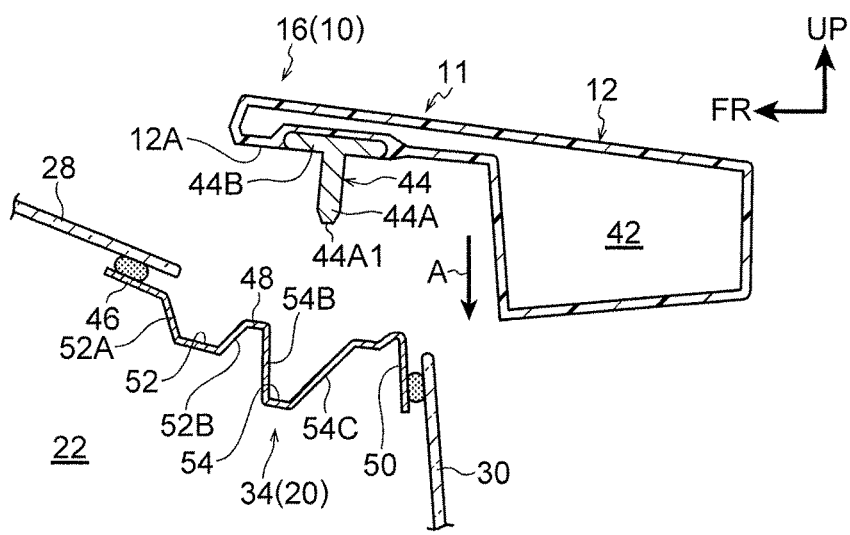
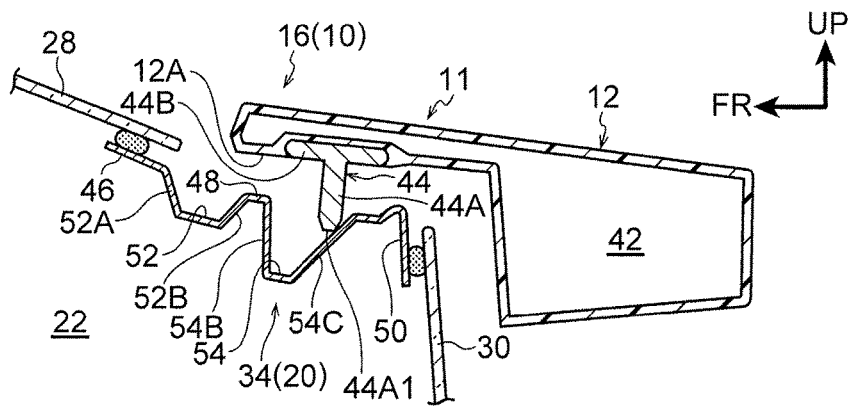
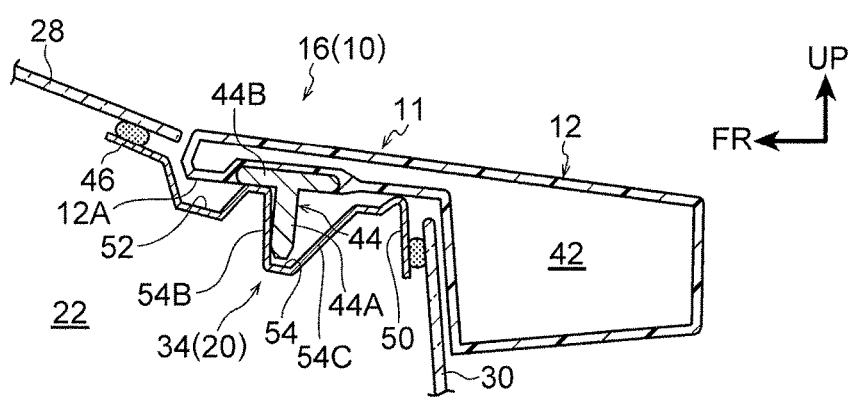

VEHICLE MEMBER ATTACHMENT STRUCTURE AND REAR SPOILER ATTACHMENT STRUCTURE

TECHNICAL FIELD

The present invention relates to a vehicle member attachment structure and a rear spoiler attachment structure.

BACKGROUND ART

Japanese Patent Application Laid-Open (JP-A) No. 2008-094209 describes technology in which a bolt provided at a rear spoiler passes through a penetrating hole formed in a resin garnish and is fastened to a vehicle body rear section, thus fixing the rear spoiler to the resin garnish. Moreover, JP-A Nos. 2006-219074 and 2010-030465 also describe technology related to an attachment structure for attaching a rear spoiler to a vehicle.

SUMMARY OF INVENTION

Technical Problem

In consideration of the above, an object of the present invention is to obtain a vehicle member attachment structure and a rear spoiler attachment structure capable of suppressing a decrease in the strength and rigidity of a vehicle member as a result of setting a positioning reference position in order to attach one vehicle member to another vehicle member.

Solution to Problem

A first aspect of the present invention provides a vehicle member attachment structure for attaching a first member to a second member. The vehicle member attachment structure includes: a reference pin that projects from the first member; a recess that is provided at the second member, and that is abutted by the reference pin; an inclined portion that is provided at the recess, that is abutted by the reference pin, and that guides the reference pin along an attachment direction of the first member; and a reference portion that is provided at the recess, and that positions the first member at an attachment direction side with respect to the second member in at least one direction of a vehicle front-rear direction or a vehicle width direction by being abutted by the reference pin that has been guided by the inclined portion.

In the above configuration, the first member is attachable to the second member, and the reference pin projects out of the first member. The recess abutted by the reference pin is provided at the second member. The reference portion that positions the first member at the attachment direction side with respect to the second member, and the inclined portion that guides the reference pin along the attachment direction of the first member, are provided at the recess.

The inclined portion is abutted by the reference pin, and guides the reference pin toward the reference portion side along the attachment direction of the first member. The position of the first member on the attachment direction side with respect to the second member is determined in at least one direction out of the vehicle front-rear direction or the vehicle width direction by the reference pin, which has been guided by the inclined portion, abutting the reference portion.

For example, when positioning one member with respect to another member, in cases in which a reference hole is formed in one member, the strength and rigidity of the one member decreases in the vicinity of the reference hole. However, in the present invention, the reference portion is provided as a recess in the second member, and since no reference hole is formed, the strength and rigidity of the second member do not decrease.

A second aspect of the present invention is the first aspect of the present invention, wherein configuration may be made such that the recess is formed running along the vehicle width direction, the reference portion is a front wall positioned at a vehicle front-rear direction front portion of the recess, and the inclined portion is an inclined wall provided at a vehicle front-rear direction rear portion of the recess, and inclined toward the front wall side on progression toward a direction of positioning the first member with respect to the second member.

In the above configuration the recess is formed running along the vehicle width direction. The front wall positioned at the vehicle front-rear direction front portion of the recess is the reference portion. The inclined portion is an inclined wall provided at the vehicle front-rear direction rear portion of the recess, and inclined toward the front wall side on progression toward the direction of positioning the first member with respect to the second member.

Thus, when positioning the first member with respect to the second member in the vehicle front direction, the reference pin provided at the first member abuts the inclined wall provided at the second member, and, in this state, the first member further approaches the second member side. When this is performed, the reference pin is guided toward the front wall along the inclined face of the inclined wall. The first member is thus positioned with respect to second member in the vehicle front direction by the reference pin abutting the front wall.

A third aspect of the present invention is the second aspect of the present invention, wherein configuration may be made such that, in a state in which the first member has been fixed to the second member, the reference pin abuts the front wall, and at least one of a head portion formed at the reference pin, or the first member, abuts a peripheral portion of the recess.

In the above configuration, in a state in which the first member has been fixed to the second member, the reference pin abuts the front wall of the recess, and at least one of the head portion formed at the reference pin, or the first member, abuts the peripheral portion of the recess provided at the second member. Input force toward the vehicle upward direction acting on the first member is thereby borne by the second member, reinforcing the first member as a result. The strength of the first member is thereby improved.

A fourth aspect of the present invention is any one of the first aspect to the third aspect of the present invention, wherein configuration may be made such that the first member is formed of resin.

In the above configuration, due to the first member being formed of resin, a weight reduction can be achieved compared to cases in which the first member is formed of metal.

The fifth aspect of the present invention is any one of the first aspect to the fourth aspect wherein configuration may be made such that a hole portion for fixing the first member is provided at a different position to the reference portion in the vehicle width direction of the second member.

Generally, in attaching a vehicle member, when fixing one member to another member by forming a hole portion in the one member and using fasteners, the hole portion is set as a reference portion. In the above configuration, the hole portion for fixing the first member is provided at a different position to the reference portion. Namely, due to the hole portion not being at the reference portion, the present invention is particularly advantageous in cases in which it would be difficult to achieve demanded high dimensional precision when forming the hole portion.

A sixth aspect of the present invention provides a rear spoiler attachment structure wherein the second member of any one aspect of the first aspect to the fifth aspect of the present invention is a back door provided at a rear end section of a vehicle, and the first member of any one aspect of the first aspect to the fifth aspect is a rear spoiler to be fixed to the back door.

In the above configuration, the back door side is not formed with a hole portion as a reference position for positioning the rear spoiler in the structure for attaching the rear spoiler to the back door. The strength and rigidity of the back door are thereby raised compared to cases in which a hole portion is formed at the back door side.

Advantageous Effects of Invention

The first aspect of the present invention has the excellent advantageous effect of being capable of suppressing a decrease in the strength and rigidity of a vehicle member as a result of setting a positioning reference position in order to attach the first member to the second member.

The second aspect of the present invention has the excellent advantageous effect of having good ease of attachment operation due to the reference pin being guided toward the front wall along the inclined face of the inclined wall upon the reference pin abutting the inclined wall.

The third aspect of the present invention has the excellent advantageous effect of raising the strength of the first member due to input force acting on the first member along the vehicle front-rear direction being borne by the second member.

The fourth aspect of the present invention has the excellent advantageous effect of enabling a decrease is cost to be achieved by forming the first member with resin.

The fifth aspect of the present invention has the excellent advantageous effect of enabling a commensurate improvement in the ease of manufacture of the second member due to not needing to secure high dimensional precision in hole processing.

The sixth aspect of the present invention has the excellent advantageous effect of being capable of suppressing a decrease in the strength and rigidity of the back door as a result of setting a positioning reference position at the back door side.

BRIEF DESCRIPTION OF DRAWINGS

FIG. 4A is an operation diagram to explain operation when attaching a rear spoiler to a door outer panel configuring a vehicle member attachment structure according to the present exemplary embodiment.

FIG. 4B is an operation diagram to explain operation when attaching a rear spoiler to a door outer panel configuring a vehicle member attachment structure according to the present exemplary embodiment, and illustrating a process after that of FIG. 4A.

FIG. 4C is an operation diagram to explain operation when attaching a rear spoiler to a door outer panel configuring a vehicle member attachment structure according to the present exemplary embodiment, and illustrating a process after that of FIG. 4B.

DESCRIPTION OF EMBODIMENTS

Explanation follows regarding a vehicle member attachment structure according to an exemplary embodiment of the present invention, with reference to the drawings. Note that the arrow FR indicates a vehicle front-rear direction front side, and the arrow UP indicates a vehicle vertical direction upper side. In the following explanation, unless specifically stated otherwise, reference to the front-rear and the vertical directions respectively indicate the front-rear in the vehicle front-rear direction and vertical in the vehicle vertical direction.

Configuration of Vehicle Member Attachment Structure

Figure 1:
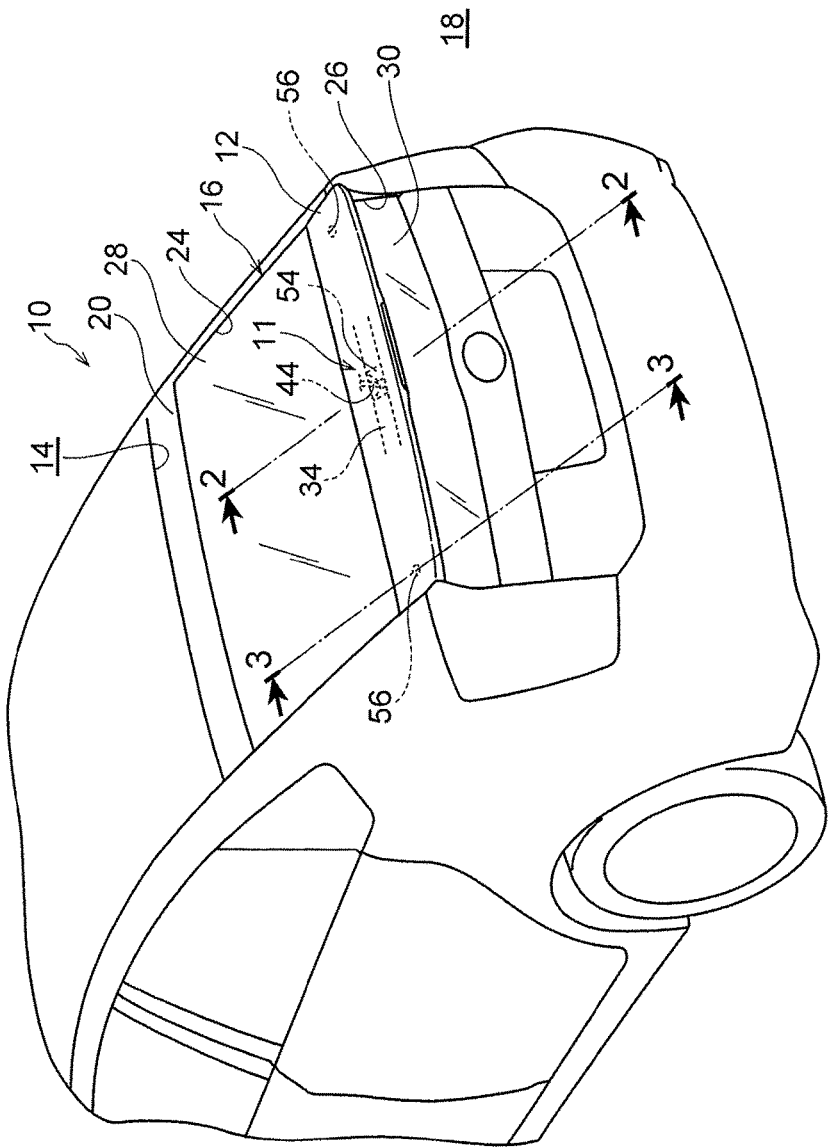
FIG. 1 is a perspective view as viewed obliquely from the left rear side of a vehicle including a back door applied with a vehicle member attachment structure according to an exemplary embodiment.

First, explanation follows regarding configuration of the vehicle member attachment structure according to an exemplary embodiment of the present invention. FIG. 1 illustrates a vehicle 10 applied with a rear spoiler attachment structure 11, serving as an example of a vehicle member attachment structure according to the present exemplary embodiment.

As illustrated in FIG. 1, an opening 14 is formed in the rear end section of the vehicle 10, and a door hinge, not illustrated in the drawings, is provided at an upper edge portion of the opening 14. A back door 16, serving as a vehicle back door structure, is supported by the door hinge so as to be capable of swinging, and the opening 14 is capable of being opened or closed off by the back door 16.

The back door 16, for example, includes a door outer panel 20 that is disposed to a vehicle exterior 18 side and configures an outer panel of the back door 16, serving as a second member, and a door inner panel (not illustrated in the drawings) that is disposed to a vehicle cabin 22 inside of the door outer panel 20 and configures an inner panel of the back door 16. Note that the door outer panel 20 is formed by a fiber reinforced plastic such as a carbon fiber reinforced plastic (CFRP). The door inner panel is also sometimes disposed at the outer panel side of the back door 16 depending on the location of the back door 16. Thus, although explanation might simply refer to a back door panel, without distinguishing between the door outer panel 20 and the door inner panel, explanation here refers to a rear spoiler 12, described later, attached to the door outer panel 20, for ease of explanation. It is accordingly obvious that the door outer panel 20 may also configure a door inner panel.

Window sections 24, 26 are respectively formed in the door outer panel 20 at an upper section and a central section in the vehicle vertical direction. A back door glass 28 is provided at the window section 24 and a back door glass 30 is provided at the window section 26.

Figure 2:
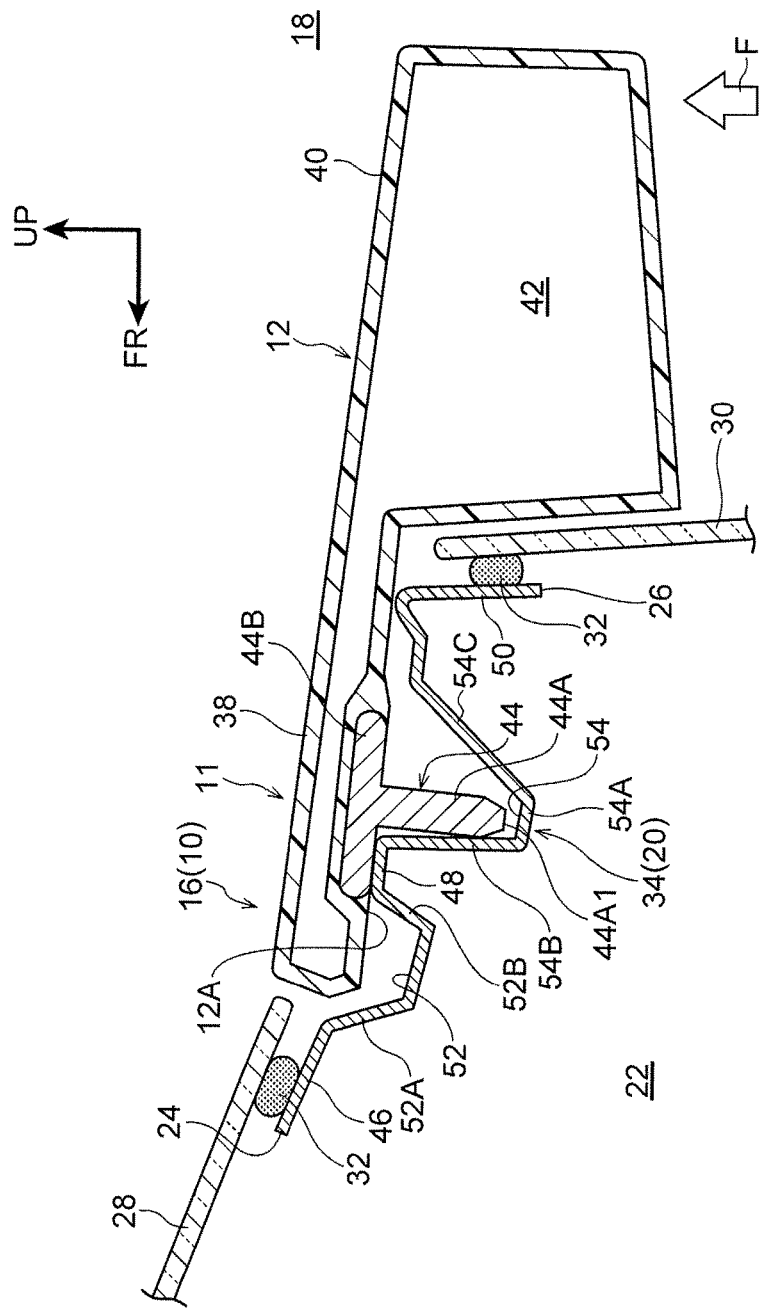
FIG. 2 is a vertical cross-section when the back door is sectioned along line 2-2 in FIG. 1.

FIG. 2 illustrates a cross-section sectioned along line 2-2 in FIG. 1. As illustrated in FIG. 2, the back door glass 28 and the back door glass 30 are respectively fixed to the door outer panel 20 using a bonding agent 32. An attached-to portion 34 forming part of the second member is provided between the window section 24 and the window section 26 of the door outer panel 20, and the resin rear spoiler 12 serving as a first member is capable of attaching to the attached-to portion 34.

The rear spoiler 12 is provided spanning across substantially the entire vehicle width direction region of the back door 16, so as to be attached to the door outer panel 20 by insert bolts 36, described later (see FIG. 3), clips (not illustrated in the drawings), or the like. The rear spoiler 12 is formed with a substantially L shaped cross-section profile sectioned along the vehicle front-rear direction, is provided at a vehicle front-rear direction front portion with an attachment portion 38 formed in a thin plate shape, and is provided at a vehicle front-rear direction rear portion with a flow regulator portion 40 formed in an angular column shape. A hollow portion 42 is provided at the insides of the attachment portion 38 and the flow regulator portion 40, and places the insides in communication with each other.

A reference pin 44 formed by metal, fiber reinforced plastic, or the like is integrally formed at the rear spoiler 12 at a substantially central portion in the vehicle width direction of the attachment portion 38. Namely, the reference pin 44 may be integrally formed (by insert molding) to the rear spoiler 12, or, in cases in which the reference pin 44 is formed of resin, the reference pin 44 may be welded to the rear spoiler 12 using a secondary process after molding the rear spoiler 12. The rear spoiler 12 may also be configured with a shape such that a shaft portion 44A forming part of the reference pin 44 projects out from a lower face 12A. The insert bolts 36 (see FIG. 3) integrally formed at the rear spoiler 12 are provided at both vehicle width direction sides of the attachment portion 38, and are formed, for example, by metal or fiber reinforced plastic.

The back door glass 28 is, as described above, provided at an upper portion of the door outer panel 20, and the back door glass 30 is provided at a central portion in the vehicle vertical direction of the door outer panel 20. The back door glass 28 is disposed so as to be in a greatly inclined state with respect to an axial line running along the vehicle vertical direction, and the back door glass 30 is disposed in an upright state along the vehicle vertical direction.

The attached-to portion 34 of the door outer panel 20 is therefore formed so as to run substantially along the vehicle front-rear direction in a state inclined along the back door glass 28. A bonding portion 46, to which the back door glass 28 is bonded, is provided at a vehicle front-rear direction front end portion of the attached-to portion 34, and a seat 48, for attaching the rear spoiler 12 to, is provided at a vehicle front-rear direction central portion of the attached-to portion 34. Moreover, a bonding portion 50 to which the back door glass 30 is bonded provided at a vehicle front-rear direction rear end portion of the attached-to portion 34.

The bonding portion 46 is formed so as to match the preset angle of inclination of the back door glass 28, and the bonding portion 46 and the back door glass 28 are thus formed so as to be substantially parallel to each other. A groove 52 is formed at the attached-to portion 34 so as to run along the vehicle width direction at the vehicle front-rear direction rear side of the bonding portion 46. The attachment portion 38 of the rear spoiler 12 is formed so as not to interfere with the door outer panel 20.

The groove 52 is formed with an inverted trapezoid shaped cross-section as sectioned along the vehicle front-rear direction. A front wall 52A positioned at a vehicle front-rear direction front portion of the groove 52 is configured as an inclined wall inclined toward the vehicle front-rear direction front side on progression toward the vehicle vertical direction upper side. A rear wall 52B positioned at a vehicle front-rear direction rear portion is configured as an inclined wall inclined toward the vehicle front-rear direction rear side on progression toward the vehicle vertical direction upper side.

The seat 48 is provided at the vehicle front-rear direction rear side of the groove 52. A recess 54 is formed running along the vehicle width direction at the vehicle front-rear direction rear side and at a vehicle width direction central portion of the seat 48. The recess 54 is formed deeper than the groove 52. A shaft portion 44A, serving as a reference pin, configures part of the reference pin 44 provided at the rear spoiler 12, and is capable of being inserted into the recess 54.

A head portion 44B configuring another part of the reference pin 44 is capable of making contact with the seat 48, serving as a peripheral portion of the recess 54 positioned between the groove 52 and the recess 54. The recess 54 is accordingly set so as to be at a depth such that a leading end portion 44A1 of the shaft portion 44A of the reference pin 44 does not make contact with a bottom wall 54A of the recess 54 prior to the head portion 44B making contact with the seat 48.

The recess 54 is formed with an inverted trapezoid shaped cross-section as sectioned along the vehicle front-rear direction. A front wall 54B, serving as a reference portion for positioning at a vehicle front-rear direction front portion is configured as a vertical wall standing up toward the vehicle vertical direction upper side, and the shaft portion 44A of the reference pin 44 is capable of making contact with the front wall 54B.

An inclined wall 54C, serving as an inclined portion for positioning at a vehicle front-rear direction rear portion of the recess 54, is inclined toward the vehicle front-rear direction rear side on progression toward the vehicle vertical direction upper side, and the leading end portion 44A1 of the shaft portion 44A of the reference pin 44 is capable of making contact with the inclined wall 54C.

Figure 3:
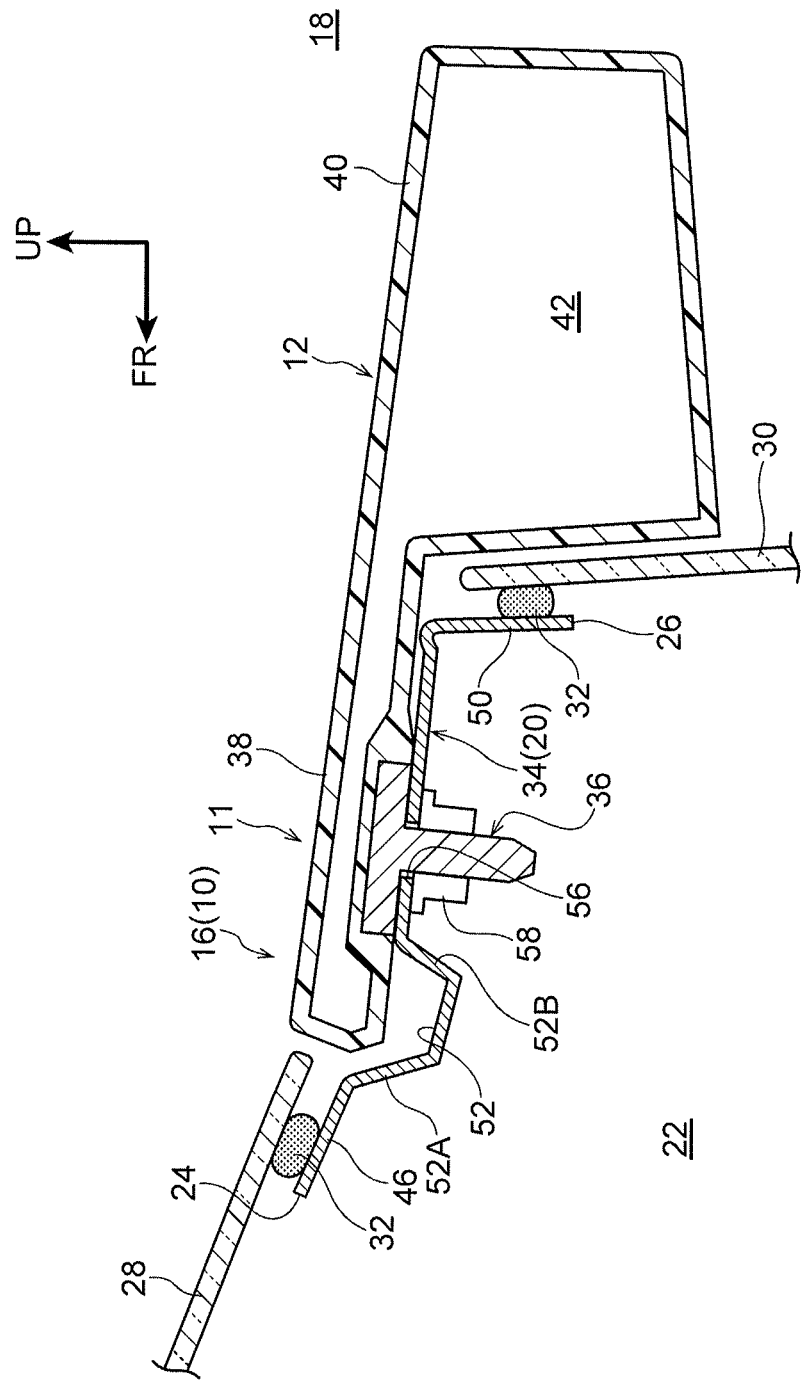
FIG. 3 is vertical cross-section when the back door is sectioned along line 3-3 in FIG. 1.

As illustrated in FIG. 1, hole portions 56 are formed at the vehicle width direction outside of the recess 54 to fix the rear spoiler 12. As illustrated in FIG. 3, the insert bolts 36 provided at the rear spoiler 12 are capable of being inserted into the hole portions 56.

Operation and Advantageous Effects of Vehicle Member Attachment Structure

Next, explanation follows regarding operation and advantageous effects of the vehicle member attachment structure according to the present exemplary embodiment. First, explanation follows regarding a method for attaching the rear spoiler 12 to the back door 16, with reference to FIG. 4A to FIG. 4C.

As illustrated in FIG. 4A, the rear spoiler 12 is caused to approach the attached-to portion 34 from the vehicle vertical direction upper side of the attached-to portion 34 configuring part of the door outer panel 20 of the back door 16. When this is performed, the reference pin 44 provided at the rear spoiler 12 faces toward the inclined wall 54C of the recess 54, and the rear spoiler 12 is moved toward (caused to approach) the back door 16 side in an attachment direction (arrow A direction).

As illustrated in FIG. 4B, in a state in which the leading end portion 44A1 of the shaft portion 44A of the reference pin 44 has made contact with the inclined wall 54C of the recess 54, the rear spoiler 12 is moved in the attachment direction (arrow A direction). When this performed, the reference pin 44 moves along the inclined face of the inclined wall 54C, the rear spoiler 12 is guided downward in the vehicle vertical direction and toward the vehicle front-rear direction front side by the reference pin 44.

Next, as illustrated in FIG. 4C, when the shaft portion 44A of the reference pin 44 abuts the front wall 54B of the recess 54, movement of the rear spoiler 12 toward vehicle front-rear direction front side is restricted by the reference pin 44. When this is performed, the head portion 44B of the reference pin 44 abuts the seat 48 of the attachment portion 38. Accordingly, movement of the rear spoiler 12 toward the vehicle vertical direction lower side is also restricted.

Namely, due to the reference pin 44 making contact with the front wall 54B of the recess 54, the rear spoiler 12 is positioned at the attachment direction side of the back door 16 in the vehicle front-rear direction and the vehicle vertical direction by the reference pin 44.

As illustrated in FIG. 3, this state is such that thread portions 36A of the insert bolts 36 provided at the rear spoiler 12 are inserted into the hole portions 56 formed in the attached-to portion 34 of the door outer panel 20. In a state in which the thread portions 36A of the insert bolts 36 have been inserted into the hole portions 56 of the attached-to portion 34, the rear spoiler 12 is fixed to the back door 16 by fastening nuts 58 onto the thread portions 36A from the vehicle cabin 22 inside.

As illustrated in FIG. 2, in the present exemplary embodiment, as described above, the rear spoiler 12 can be positioned at the attachment direction side of the back door 16 in the vehicle front-rear direction and the vehicle vertical direction due to the recess 54 being formed at the attached-to portion 34 of the door outer panel 20, and due to the reference pin 44 provided at the rear spoiler 12 making contact with the front wall 54B of the recess 54.

For example, although not illustrated in the drawings, when positioning one member with respect to another member, in cases in which a reference hole is formed in one member, the rigidity of the one member decreases in the vicinity of the reference hole. However, in the present exemplary embodiment, since no reference hole is formed in the door outer panel 20, the strength and rigidity of the door outer panel 20 do not decrease. Namely, the strength and rigidity of the door outer panel 20 can be suppressed from decreasing as a result of setting a positioning reference position on the door outer panel 20.

The inclined wall 54C is provided at the recess 54 so as to match the attachment direction of the rear spoiler 12 to the door outer panel 20. In order to position the rear spoiler 12 at the attachment direction side of the back door 16 in the vehicle front-rear direction and the vehicle vertical direction, the leading end portion 44A1 of the shaft portion 44A of the reference pin 44 is caused to contact the inclined wall 54C. In this state, the rear spoiler 12 can be guided to a specific position by the reference pin 44 by moving the rear spoiler 12 toward the vehicle vertical direction lower side. Good attachment operation is thereby accomplished.

Generally, when attaching a rear spoiler 12 to a door outer panel 20, a reference hole for attaching the rear spoiler 12 is set as the reference portion; however, in the present exemplary embodiment the hole portions 56 (see FIG. 3) are provided to fix the rear spoiler 12 member at positions different from the reference position. Namely, since the hole portions 56 are not employed as the reference position, this is particularly advantageous in cases in which it would be difficult to achieve the high dimensional precision demanded when forming the hole portions 56. Thus, due to not needing to secure high dimensional precision when manufacturing the hole portions 56, the ease of manufacturing the door outer panel 20 can be raised, enabling a cost reduction by an according amount.

In particular, in cases in which sheets are pressed when employing fiber reinforced resin, for the material of the door outer panel 20, post-processing by a laser or the like needs to be performed to form the hole portions. Thus, it is difficult to achieve high precision in the hole positions, hole diameter, and the like. However, since reference holes are not formed in the present invention, it is particularly effective in cases in which fiber reinforced plastic is employed as the material of the door outer panel 20.

Moreover, in the state in which the rear spoiler 12 has been fixed to the back door 16, in the present exemplary embodiment, the shaft portion 44A of the reference pin 44 abuts the front wall 54B of the recess 54, and the head portion 44B provided at the reference pin 44 abuts the seat 48, serving as a peripheral portion of the recess 54. Thus input force F toward the vehicle upward direction acting on the rear spoiler 12 is borne through the door outer panel 20 by the back door 16, reinforcing the rear spoiler 12 as a result. The strength of the rear spoiler 12 is thereby improved.

Due to forming the recess 54 in the attached-to portion 34 of the door outer panel 20, the bulk in the height direction of the attached-to portion 34 can be raised along the vehicle vertical direction in cross-section profile sectioned along the vehicle front-rear direction. The rigidity of the attached-to portion 34 can thereby be raised more than cases in which the recess 54 is not formed. The rear spoiler 12 on which input force F acts toward the vehicle upward direction is attached to the attached-to portion 34 as described above, thereby enabling deformation of the attached-to portion 34 to be particularly effectively suppressed.

Other Exemplary Embodiments

In the present exemplary embodiment, as illustrated in FIG. 2, the front wall 54B of the recess 54 serves as the reference position; however, which wall (front wall, rear wall, side wall) in the recess 54 serves as the positioning reference differs depending on the attachment direction of the rear spoiler 12 to the door outer panel 20. The position of the reference portion is accordingly changeable with time according to the attachment direction of the rear spoiler 12.

In the present exemplary embodiment, the inclined wall 54C is formed as the inclined portion that guides the reference pin 44 toward the front wall 54B side, and the inclined portion here is an inclined wall on one face that is inclined toward the vehicle front direction. However, in the present invention, the inclined portion may be inclined toward the vehicle front direction and vehicle rear direction, and may be an inclined wall with a tapered shape formed on two faces disposed so as to face each other. In such cases, the rear spoiler 12 can be positioned in the vehicle front-rear direction of the back door 16. Moreover, although not illustrated in the drawings, in tapered shape cases, a conical recess of a cone shape may be formed, and the reference pin 44 may be guided by the conical recess. The rear spoiler 12 can thereby be positioned in the vehicle width direction and the vehicle front-rear direction of the back door 16. Here, "taper" refers to cases in which at least two faces that face each other are symmetrically inclined, and encompasses the profile of the cone shape mentioned above. In contrast, "inclined portion" means cases in which at least one face is inclined, and is a concept that encompasses the "taper".

The angle of inclination may be set so as to change partway on the inclined wall 54C. For example, the angle of inclination on the front wall 54B side may be set so as to be gentle. Thus on the rear spoiler 12, the stroke toward the vehicle front-rear direction front side can therefore be made longer than the stroke of the rear spoiler 12 toward the vehicle vertical direction lower side, and the shaft portion 44A of the reference pin 44 can thereby be caused to slowly contact the front wall 54B.

The present exemplary embodiment is configured such that the head portion 44B of the reference pin 44 abuts the seat 48 of the recess 54 in a state in which the rear spoiler 12 has been fixed to the back door 16; however, configuration may be made such that the lower face 12A of the rear spoiler 12 abuts the seat 48 of the recess 54.

The present exemplary embodiment is configured such that the insert bolts 36 are inserted into the hole portions 56 of the attached-to portion 34, and the nuts 58 are fastened onto the insert bolts 36; however, there is no limit thereto. For example, clips (not illustrated in the drawings) for anchoring in the hole portions 56 may be used in place of the insert bolts 36.

In the present exemplary embodiment, explanation has been given regarding the attachment structure of the rear spoiler 12; however, the present invention has applicability outside of the rear spoiler 12. For example, application may be made to a front spoiler, a side spoiler, or the like, or application may be made to an attachment structure on a side door, such as a side door outer panel or door trim.

Explanation has been given above regarding an exemplary embodiment of the present invention. However, the present invention is not limited thereto, and obviously various other modifications may be implemented within a range not departing from the spirit of the present invention.

The invention claimed is:

1. A vehicle member attachment structure for attaching a first member to a second member, the structure comprising:
    a reference pin that projects from the first member;
    a recess that is provided at the second member, that is abutted by the reference pin, and that opens toward a vehicle upper side;
    an inclined portion that is provided at the recess, that is inclined such that the recess becomes wider on progression toward the vehicle upper side, that is abutted by the reference pin, and that guides the reference pin along an attachment direction of the first member; and
    a reference portion that is provided at the recess, and that positions the first member at the attachment direction with respect to the second member in at least one direction of a vehicle front-rear direction or a vehicle width direction by being abutted by the reference pin that has been guided by the inclined portion,
    wherein the second member is a back door provided at a rear end section of a vehicle, and the first member is a rear spoiler to be fixed to the back door.

2. The vehicle member attachment structure of claim 1, wherein:
    the recess is formed along the vehicle width direction;
    the reference portion is a front wall positioned at a vehicle front-rear direction front portion of the recess; and
    the inclined portion is an inclined wall provided at a vehicle front-rear direction rear portion of the recess, and inclined toward the front wall on progression toward a direction of positioning the first member with respect to the second member.

3. The vehicle member attachment structure of claim 2, wherein, in a state in which the first member has been fixed to the second member, the reference pin abuts the front wall, and at least one of a head portion formed at the reference pin, or the first member, abuts a peripheral portion of the recess.

4. The vehicle member attachment structure of claim 1, wherein the first member is formed of resin.

5. The vehicle member attachment structure of claim 1, wherein a hole portion for fixing the first member is provided at a different position from the reference portion in the vehicle width direction of the second member.

* * * * *